US008053942B2

(12) United States Patent
Abe et al.

(10) Patent No.: US 8,053,942 B2
(45) Date of Patent: Nov. 8, 2011

(54) AXIAL GAP MOTOR

(75) Inventors: Shoei Abe, Kawachi-gun (JP); Hirofumi Atarashi, Shioya-gun (JP); Keiichi Yamamoto, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/670,601

(22) PCT Filed: Jul. 9, 2008

(86) PCT No.: PCT/JP2008/062383

§ 371 (c)(1),
(2), (4) Date: Jan. 25, 2010

(87) PCT Pub. No.: WO2009/028266

PCT Pub. Date: Mar. 5, 2009

(65) Prior Publication Data

US 2010/0231079 A1 Sep. 16, 2010

(30) Foreign Application Priority Data

Aug. 29, 2007 (JP) ................................ 2007-223058

(51) Int. Cl.
*H02K 1/27* (2006.01)

(52) U.S. Cl. .............................. 310/156.64; 310/156.48

(58) Field of Classification Search ............. 310/156.08, 310/156.31, 156.33–156.57, 156.62–156.65, 310/216.074–216.075, 216.091–216.093, 310/266–268

See application file for complete search history.

(56) References Cited

U.S. PATENT DOCUMENTS

| | | | |
|---|---|---|---|
| 336,087 | A | 2/1886 | Brush |
| 2,154,146 | A | 4/1939 | Becker |
| 2,632,861 | A | 3/1953 | Morton et al. |

(Continued)

FOREIGN PATENT DOCUMENTS

EP 1 612 913 A2 1/2006

(Continued)

OTHER PUBLICATIONS

Z. Q. Zhu, et al.: "Influence of Design Parameters on Cogging Torque in Permanent Magnet Machines", IEEE Transactions on Energy Conversion, IEEE Service Center, Piscataway, NJ, USA, vol. 15, No. 4, Dec. 1, 2000, pp. 407-412. (XP01101561).

*Primary Examiner* — Tran Nguyen
(74) *Attorney, Agent, or Firm* — Arent Fox LLP

(57) ABSTRACT

The present axial gap motor is provided with: a rotor that is rotatable around a rotation axis; and a pair of stators that are opposed to each other with the rotor interposed therebetween from both sides in a rotation axis direction which is parallel with the rotation axis of the rotor. The rotor includes: a plurality of main magnets arranged in a circumferential direction so that a flux direction is parallel with the rotation axis direction; a sub permanent magnet which is disposed in the vicinity of a circumferential end portion of the main magnet and is magnetized in a direction perpendicular to the rotation axis direction and a radial direction; and a magnetic member which is provided on a surface of at least one of the one side and the other side in the rotation axis direction of the main magnet. A length of the magnetic member in the rotation axis direction is larger than a length of the sub permanent magnet in the rotation axis direction.

2 Claims, 8 Drawing Sheets

U.S. PATENT DOCUMENTS

| | | | | |
|---|---|---|---|---|
| 3,108,200 | A | 10/1963 | Baldwin | |
| 3,465,188 | A | 9/1969 | Sisk | |
| 3,591,819 | A | 7/1971 | Laing | |
| 3,762,042 | A * | 10/1973 | Abe et al. | 29/598 |
| 3,956,651 | A | 5/1976 | Brammerlo | |
| 4,007,387 | A | 2/1977 | Rustecki | |
| 4,095,150 | A | 6/1978 | Senckel | |
| 4,363,988 | A | 12/1982 | Kliman | |
| 4,410,820 | A | 10/1983 | Stanley | |
| 4,864,175 | A | 9/1989 | Rossi | |
| 4,996,457 | A | 2/1991 | Hawsey et al. | |
| 5,142,179 | A | 8/1992 | Nakamura et al. | |
| 5,245,238 | A | 9/1993 | Lynch et al. | |
| 5,334,899 | A | 8/1994 | Skybyk | |
| 5,387,854 | A | 2/1995 | McCleer et al. | |
| 5,394,321 | A | 2/1995 | McCleer et al. | |
| 5,397,953 | A * | 3/1995 | Cho | 310/216.015 |
| 5,642,009 | A * | 6/1997 | McCleer et al. | 310/156.35 |
| 5,671,524 | A | 9/1997 | Damsky et al. | |
| 5,731,649 | A | 3/1998 | Caamaño | |
| 5,757,108 | A | 5/1998 | Suzuki | |
| 5,907,210 | A | 5/1999 | Chaix | |
| 5,925,965 | A | 7/1999 | Li et al. | |
| 5,955,809 | A | 9/1999 | Shah | |
| 6,034,459 | A | 3/2000 | Matsunobu et al. | |
| 6,373,162 | B1 | 4/2002 | Liang et al. | |
| 6,739,034 | B2 | 5/2004 | Suzuki et al. | |
| 6,809,453 | B2 | 10/2004 | Narita et al. | |
| 6,919,663 | B2 | 7/2005 | Iles-Klumpner | |
| 6,960,860 | B1 | 11/2005 | DeCristofaro et al. | |
| 6,995,494 | B2 * | 2/2006 | Haugan et al. | 310/268 |
| 7,144,468 | B2 | 12/2006 | Decristofaro et al. | |
| 7,230,359 | B2 | 6/2007 | Iles-Klumpner | |
| 7,230,361 | B2 | 6/2007 | Hirzel | |
| 7,315,102 | B2 | 1/2008 | Minagawa | |
| 7,355,311 | B2 | 4/2008 | Shimizu | |
| 7,679,260 | B2 | 3/2010 | Yamamoto et al. | |
| 7,737,594 | B2 | 6/2010 | Abe et al. | |
| 2004/0070307 | A1 | 4/2004 | Haugan et al. | |
| 2005/0194855 | A1 | 9/2005 | Hasebe et al. | |
| 2005/0285467 | A1 | 12/2005 | Shimizu | |
| 2006/0028093 | A1 * | 2/2006 | Minagawa et al. | 310/268 |
| 2006/0238056 | A1 | 10/2006 | Alvarez et al. | |
| 2006/0273676 | A1 * | 12/2006 | Naruse et al. | 310/156.32 |
| 2006/0284507 | A1 * | 12/2006 | Murakami | 310/156.37 |
| 2007/0018520 | A1 * | 1/2007 | Kaneko et al. | 310/156.35 |
| 2007/0080598 | A1 * | 4/2007 | Naruse | 310/156.56 |
| 2007/0170802 | A1 | 7/2007 | Potoradi | |
| 2008/0129136 | A1 | 6/2008 | Abe et al. | |
| 2008/0290752 | A1 | 11/2008 | Yamamoto et al. | |
| 2009/0243422 | A1 | 10/2009 | Atarashi et al. | |
| 2009/0251021 | A1 | 10/2009 | Atarashi et al. | |
| 2009/0295245 | A1 | 12/2009 | Abe et al. | |
| 2009/0295246 | A1 | 12/2009 | Abe | |
| 2010/0090555 | A1 | 4/2010 | Tajima et al. | |
| 2010/0117474 | A1 | 5/2010 | Atarashi et al. | |
| 2010/0141075 | A1 | 6/2010 | Atarashi et al. | |
| 2010/0187933 | A1 | 7/2010 | Yamamoto et al. | |
| 2010/0219710 | A1 | 9/2010 | Kawamura et al. | |

FOREIGN PATENT DOCUMENTS

| | | | |
|---|---|---|---|
| EP | 1 850 451 | A1 | 10/2007 |
| JP | 55-053161 | A | 4/1980 |
| JP | 59-144352 | A | 8/1984 |
| JP | 59-230453 | A | 12/1984 |
| JP | 02-079174 | A | 3/1990 |
| JP | 02-079174 | U | 6/1990 |
| JP | 6-500457 | A | 1/1994 |
| JP | 6-205554 | A | 7/1994 |
| JP | 9-168263 | A | 6/1997 |
| JP | 10-164779 | A | 6/1998 |
| JP | 10-164799 | A | 6/1998 |
| JP | 10-271784 | A | 10/1998 |
| JP | 3-062085 | U | 9/1999 |
| JP | 3062085 | U | 9/1999 |
| JP | 11-299199 | A | 10/1999 |
| JP | 11-511948 | A | 10/1999 |
| JP | 2000-197301 | A | 7/2000 |
| JP | 2000-262026 | A | 9/2000 |
| JP | 2001057753 | A * | 2/2001 |
| JP | 2001-136721 | A | 5/2001 |
| JP | 2001-251817 | A | 9/2001 |
| JP | 2002-112481 | A | 4/2002 |
| JP | 2005-094955 | A | 4/2005 |
| JP | 2005-143288 | A | 6/2005 |
| JP | 2005-269778 | A | 9/2005 |
| JP | 2005304245 | A * | 10/2005 |
| JP | 2005-318782 | A | 11/2005 |
| JP | 2005-341696 | A | 12/2005 |
| JP | 2006-025482 | A | 1/2006 |
| JP | 2006-166635 | A | 6/2006 |
| JP | 2006-222131 | A | 8/2006 |
| JP | 2006-527578 | A | 11/2006 |
| JP | 2006-345627 | A | 12/2006 |
| JP | 2007-028868 | A | 2/2007 |
| JP | 2007-037210 | A | 2/2007 |
| JP | 2007-053844 | A | 3/2007 |
| JP | 2007-089270 | A | 4/2007 |
| JP | 2007-104819 | A | 4/2007 |
| JP | 2007-151321 | A | 6/2007 |
| JP | 2007-215291 | A | 8/2007 |
| JP | 2008-022663 | A | 1/2008 |
| JP | 2008-048497 | A | 2/2008 |
| JP | 2008-104278 | A | 5/2008 |
| JP | 2008-167639 | A | 7/2008 |
| WO | WO 92/20131 | A2 | 11/1992 |
| WO | WO 96/29774 | A1 | 9/1996 |
| WO | WO 2004/109894 | A1 | 12/2004 |
| WO | WO 2006/077812 | A1 | 7/2006 |
| WO | WO 2007/091727 | A1 | 8/2007 |

* cited by examiner

AXIAL GAP MOTOR

CROSS-REFERENCE TO RELATED APPLICATION

This application is a National Stage entry of International Application No. PCT/JP2008/062383, having an international filing date of Jul. 9, 2008; which claims priority to Japanese Application No.: 2007-223058, filed Aug. 29, 2007, the disclosure of each of which is hereby incorporated in its entirety by reference.

TECHNICAL FIELD

The present invention relates to an axial gap motor.

Priority is claimed on Japanese Patent Application No. 2007-223058, filed on Aug. 29, 2007, the content of which is incorporated herein by reference.

BACKGROUND ART

In general, for example, there is known an axial gap permanent-magnet synchronous machine which includes a pair of stators opposed to each other with a rotor interposed therebetween from both sides of a rotation axis direction to form flux loops through the pair of stators, with respect to a magnetic field flux caused by a permanent magnet of the rotor (refer to Patent Documents 1 and 2).

[Patent Document 1] Japanese Unexamined Patent Application, First Publication No. H10-271784

[Patent Document 2] Japanese Unexamined Patent Application, First Publication No. 2001-136721

DISCLOSURE OF INVENTION

Problems to be Solved by the Invention

In permanent-magnet synchronous machines related to the prior art, particularly in a permanent-magnet synchronous machine including a rotor provided with permanent magnets and a magnetic material which are magnetized only in the same direction as the rotation axis direction and disposed in a circumferential direction, there are problems in that, for example, as compared with a permanent-magnet synchronous machine including a rotor provided with permanent magnets of which the magnetization direction is reversed and which are alternatively disposed in a circumferential direction, magnet torque is reduced by half, and reluctance torque cannot be effectively utilized.

In addition, in a permanent-magnet synchronous machine including a rotor in which permanent magnets of which a magnetization direction is reversed are alternatively disposed in a circumferential direction and a magnetic material is interposed between the permanent magnets which are adjacent to each other in the circumferential direction, since the phase of magnet torque and the phase of reluctance torque are different from each other, there is a problem in that the magnet torque and the reluctance torque cannot be effectively used.

In addition, in such a permanent-magnet generator, when a desired flux loop is to be formed through a pair of stators, increasing torque potential by suppressing an unnecessary flux short-circuit loop from being formed and suitably increasing the amount of flux linkage for stator winding linkage is required.

Means for Solving the Problem

The present invention was made in view of the above-mentioned circumstances, and has an object of providing an axial gap motor capable of suppressing the formation of an unnecessary flux short-circuit loop, and effectively increasing output by effectively using permanent magnets and magnetic members provided in a rotor.

In order to resolve the above problems and achieve the above object, the present invention employs the followings.

According to an aspect of the invention, there is provided an axial gap motor provided with: a rotor that is rotatable around a rotation axis; and a pair of stators that are opposed to each other with the rotor interposed therebetween from both sides in a rotation axis direction which is parallel with the rotation axis of the rotor, wherein the rotor includes: a plurality of main magnets arranged in a circumferential direction so that the flux direction is parallel with the rotation axis direction; a sub permanent magnet which is disposed in the vicinity of a circumferential end portion of the main magnet and is magnetized in a direction perpendicular to the rotation axis direction and a radial direction; and a magnetic member which is provided on a surface of at least one of the one side and the other side of the main magnet in the rotation axis direction, and wherein the length of the magnetic member in the rotation axis direction is larger than the length of the sub permanent magnet in the rotation axis direction.

In the axial gap motor, a circumferential end portion of the magnetic member may be provided with a chamfered portion having a chamfered shape.

In the axial gap motor, the chamfered portion may change to be reduced in size from an outside toward an inside in the radial direction.

In the axial gap motor, a circumferential end portion of the magnetic member may be provided with a curved surface portion having a substantially arc shaped cross-section in the radial direction.

In the axial gap motor, the curved surface portion changes to be reduced in size from the outside toward an inside in the radial direction.

Advantage of the Invention

In the axial gap motor according to the invention, the sub permanent magnet magnetized in a direction perpendicular to the magnetization direction of the main magnet is provided on a circumferential end portion of the main magnet. Accordingly, due to a flux lens effect caused by a so-called Halbach array of the main magnet and the sub permanent magnet, the fluxes of the main magnet and the sub permanent magnet are converted, thereby increasing an amount of flux interlinked with the stator winding of the stator.

In addition, the magnetic member is provided on a surface of the main magnet, so that reluctance torque can be increased. In addition, degradation in the permeance of the main magnet can be prevented, so that the demagnetization of the main magnet can be suppressed.

Moreover, since the length of the magnetic member in the rotation axis direction is larger than the length of the sub permanent magnet in the rotation axis direction so as to protrude toward the stator as compared with the sub permanent magnet, so that the reluctance torque can further be increased. Therefore, torque that can be output can be increased without increasing the amount of permanent magnets for the rotor.

In addition, since the circumferential end portion of the magnetic member has a chamfered shape, a void can be enlarged for the front end portion of the tooth protruding from the stator toward the rotor, for example, a front end which is more likely to have flux leakage due to its surface bend, for example, at a substantially right angle or substantially acute angle, so that the circumferential end portion of the magnetic member can be given a shape which is less likely to cause flux leakage. Accordingly, the generation of a short-circuit loop of magnet flux between the front end portion of the tooth and the circumferential end portion of the magnetic member is suppressed, thereby preventing the degradation in torque potential. Further, due to the chamfered portion, the generation of torque ripple can be suppressed.

In addition, with regard to a plurality of teeth provided along the circumferential direction of the stator, a stator winding is mounted in a slot formed between the adjacent teeth. Therefore, when the circumferential width of the slot is made uniform from the outside toward the inside in the radial direction, the circumferential width of each tooth changes to be reduced in size from the outside toward the inside in the radial direction. On the contrary, when the circumferential width of the sub permanent magnet is made uniform from the outside toward the inside in the radial direction, an interval between the magnetic members (that is, an interval between their circumferential end portions opposed to each other) between which the sub permanent magnet is interposed from the both sides of the circumferential direction is uniform from the outside toward the inside in the radial direction. Therefore, a distance between the front end portion of the tooth and the circumferential end portion of the magnetic member changes to be increased from the outside toward the inside in the radial direction. Accordingly, since the chamfered portion of the circumferential end portion of the magnetic member changes to be reduced in size from, the outside toward the inside in the radial direction, the distance between the front end portion of the tooth and the chamfered portion of the circumferential end portion of the magnetic member can be made uniform from the outside toward the inside in the radial direction. Therefore, for example, it is possible to prevent the generation of points where flux leakage is likely to occur due to nonuniformity in the distance in the radial direction.

In addition, since the circumferential end portion of the magnetic member has the curved surface portion having a substantially arc shaped cross-section in the radial direction, a void can be enlarged for the front end portion of the tooth protruding from the stator toward the rotor, for example, a front end which is more likely to have flux leakage due to its surface bend, for example, at a substantially right angle or substantially acute angle. In addition, the circumferential end portion of the magnetic member can be given a shape which is less likely to cause flux leakage. Accordingly, the generation of a short-circuit loop of magnet flux (especially, flux of the sub permanent magnet) between the front end portion of the tooth and the circumferential end portion of the magnetic member is suppressed, thereby preventing the degradation in torque potential. Further, due to the curved surface portion, the generation of torque ripple can be suppressed.

In addition, with regard to a plurality of the teeth provided along the circumferential direction of the stator, a stator winding is mounted in a slot formed between the adjacent teeth. Therefore, when the circumferential width of the slot is made uniform from the outside toward the inside in the radial direction, the circumferential width of each tooth changes to be reduced in size from the outside toward the inside in the radial direction. On the contrary, when the circumferential width of the sub permanent magnet is made uniform from the outside toward the inside in the radial direction, an interval between the magnetic members (that is, an interval between their circumferential end portions opposed to each other) between which the sub permanent magnet is interposed from the both sides of the circumferential direction is uniform from the outside toward the inside in the radial direction. Therefore, the distance between the front end portion of the tooth and the circumferential end portion of the magnetic member changes to be increased from the outside toward the inside in the radial direction. Accordingly, since the curved surface portion of the circumferential end portion of the magnetic member changes to be reduced in size from the outside toward the inside in the radial direction, the distance between the front end portion of the tooth and the curved surface portion of the circumferential end portion of the magnetic member can be made uniform from the outside toward the inside in the radial direction. Therefore, for example, it is possible to prevent the generation of points where flux leakage is likely to occur due to nonuniformity in the distance in the radial direction.

DESCRIPTION OF REFERENCE NUMERALS AND SIGNS

10: AXIAL GAP MOTOR
11: ROTOR
12: STATOR
22: TEETH
23: SLOT
41: MAIN PERMANENT MAGNET PIECE (MAIN MAGNET)
42: MAGNETIC MEMBER
42*a*: CHAMFERED PORTION
42*b*: CURVED SURFACE PORTION
43: SUB PERMANENT MAGNET PIECE (SUB PERMANENT MAGNET)

BEST MODE FOR CARRYING OUT THE INVENTION

Hereinafter, an axial gap motor according to an embodiment of the invention will be described with reference to the accompanying drawings.

Figure 1:
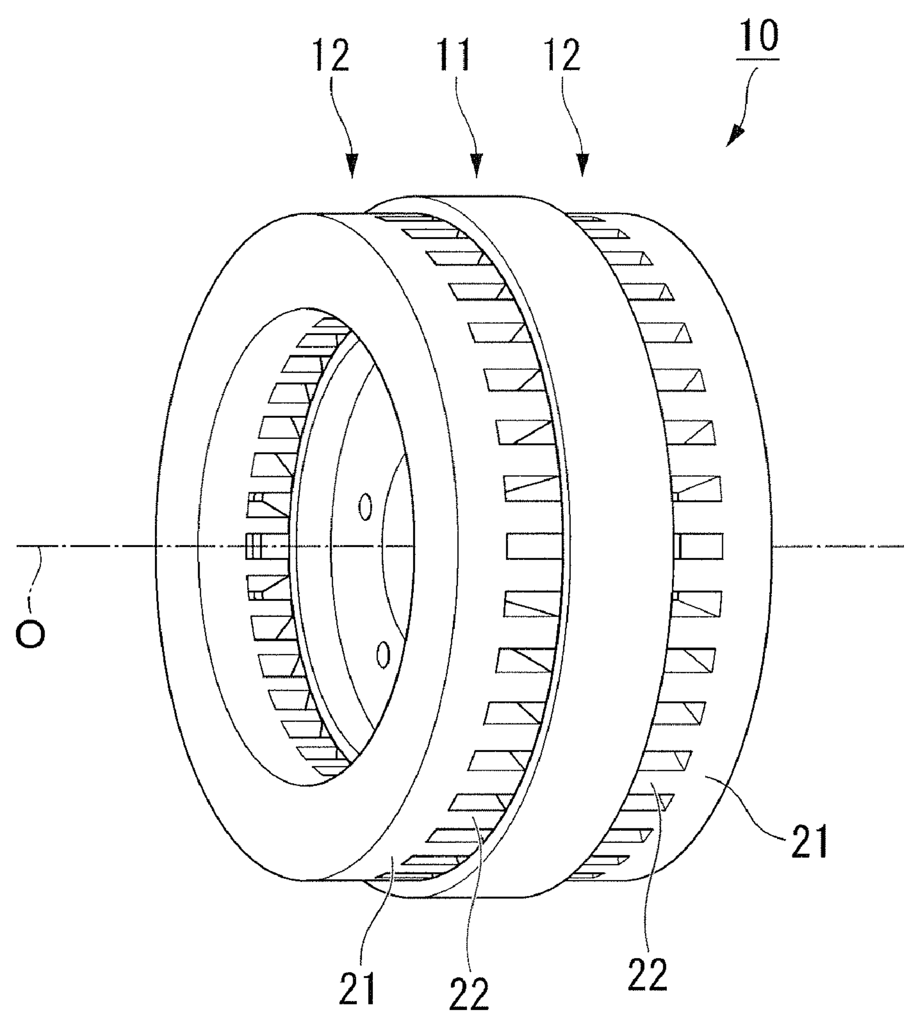
FIG. 1 is a perspective view of an axial gap motor according to an embodiment of the present invention.
Figure 2:
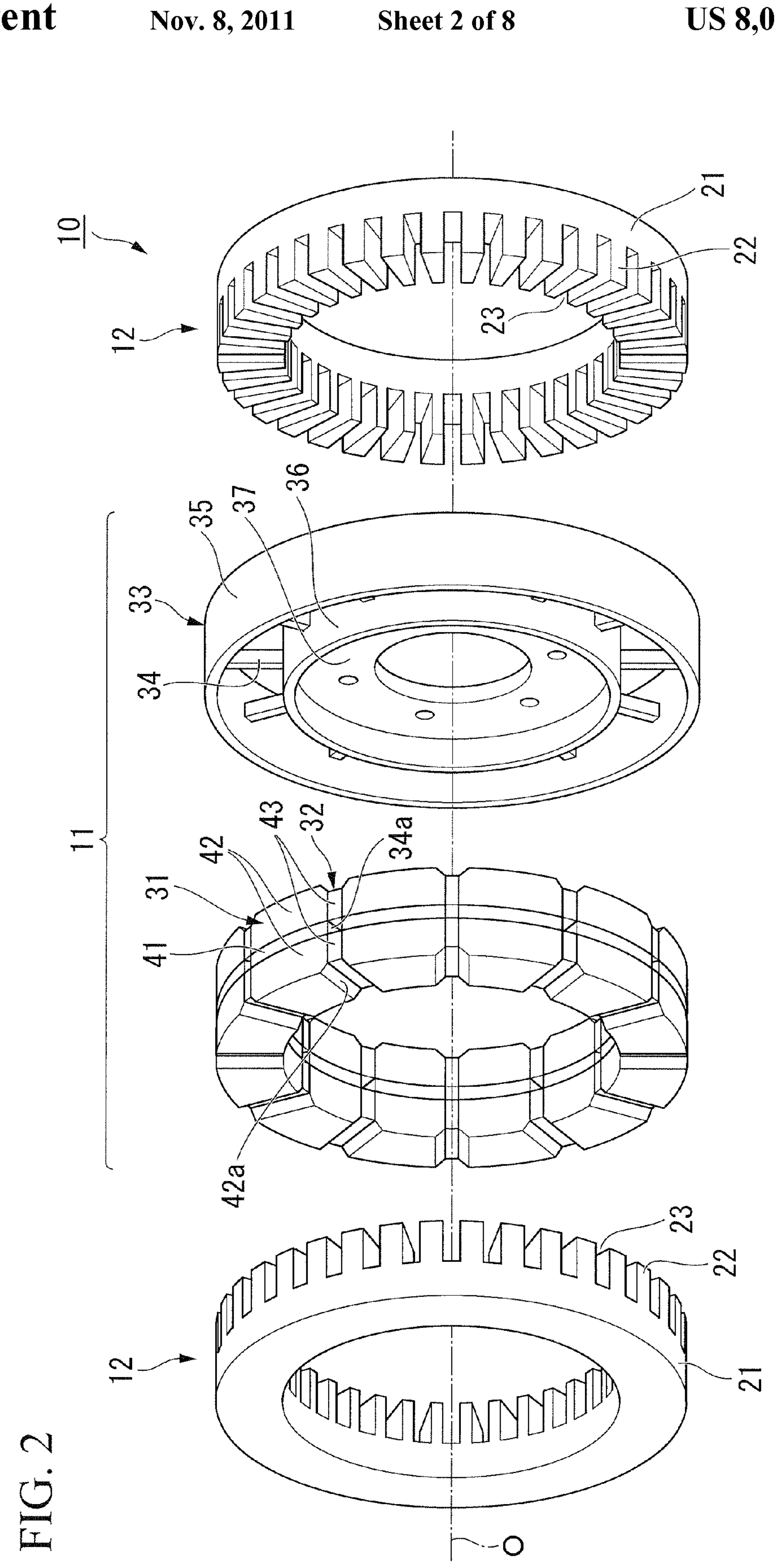
FIG. 2 is an exploded perspective view of a rotor of an axial gap motor according to the present embodiment.

The axial gap motor 10 according to the present embodiment is provided with, as illustrated in FIGS. 1 and 2, a rotor 11 having a substantially annular shape to rotate around a rotation axis O of the axial gap motor 10, and a pair of stators 12 which are opposed to each other with the rotor 11 interposed therebetween from the both sides in rotation axis O direction and each of which has a stator winding (not shown) of a plurality of phases to generate a rotating magnetic field for rotating the rotor 11.

The axial gap motor 10 is mounted in a vehicle such as a hybrid vehicle or an electric vehicle as a driving source, and an output shaft thereof is connected to an input shaft of a transmission (not shown) to transmit the driving force of the axial gap motor 10 to drive wheels (not shown) of the vehicle through the transmission.

When driving force is transmitted to the axial gap motor 10 from the drive wheels during a reduction in speed of the vehicle, the axial gap motor 10 functions as a generator to generate a so-called regenerative braking force and recover kinetic energy of the frame of the vehicle into electrical energy (regenerative energy). In addition, for example, in a hybrid vehicle, if a rotation shaft of the axial gap motor 10 is connected to a crankshaft of an internal-combustion engine (not shown), even in a case where the output of the internal-combustion engine is transmitted to the axial gap motor 10, the axial gap motor 10 functions as a generator to generate energy.

Each stator 12 includes a yoke portion 21 having a substantially annular plate shape, a plurality of teeth 22 which are provided on a surface of the yoke portion 21 which is opposed to the rotor 11 to protrude toward the rotor 11 in parallel with the rotation axis O direction at positions with predetermined intervals along a circumferential direction and extend in a radial direction, and a stator winding (not shown) suitably installed between the teeth 22.

Each stator 12 is, for example, of a 6N type having 6 main poles (for example, $U^+$, $V^+$, $W^+$, $U^-$, $V^-$, and $W^-$) so that the $U^+$, $V^+$, and $W^+$ poles of the one stator (first stator) 12 are opposed to the $U^-$, $V^-$, and $W^-$ poles of the other stator (second stator) 12 in the rotation axis O direction.

For example, with regard to a pair of the stators 12 which are opposed to each other in the rotation axis O direction, the 3 teeth 22 of the first stator 12 which correspond to the $U^+$, $V^+$, $W^+$ poles and the 3 teeth 22 of the second stator 12 which correspond to the $U^-$, $V^-$, $W^-$ poles are opposed to each other in the rotation axis O direction, and conducting states of the teeth 22 of the first stator 12 and the teeth 22 of the second stator 12 which are opposed to each other in the rotation axis O direction are set to be inverted at an electric angle.

A circumferential width of each of the teeth 22 is set to be reduced toward the inside from the outside in the radial direction. An interval in the circumferential direction between the teeth 22 which are adjacent to each other in the circumferential direction, that is, a width of a slot 23 extending in the radial direction between the teeth 22 adjacent in the circumferential direction has a predetermined constant value in the radial direction.

The rotor 11 includes a plurality of main magnet pole portions 31, a plurality of sub magnet portions 32, and a rotor frame 33 made of a nonmagnetic material. The main magnet pole portions 31 and the sub magnet portions 32 are alternately arranged in the circumferential direction and are accommodated in the rotor frame 33.

The rotor frame 33 includes an outer-peripheral cylindrical portion 35 and an inner-peripheral cylindrical portion 36 which are connected with a plurality of radial ribs 34 arranged at predetermined intervals along the circumferential direction, and a connection portion 37 which has an annular shape protruding inwards from an inner peripheral surface of the inner-peripheral cylindrical portion 36 to be connected to an external drive shaft (for example, an input shaft of a transmission of a vehicle).

In this embodiment, the inner-peripheral cylindrical portion 36 of the rotor frame 33 is connected to the external drive shaft, so that a radially inner side of the radial rib 34 serves as a shaft part side, and a radially outer side of the radial rib 34 serves as a rim part side.

A plurality of the main magnet pole portions 31 accommodated in the rotor frame 33 are interposed between the inner-peripheral cylindrical portion 36 and the outer-peripheral cylindrical portion 35 from both sides of the radial direction and are arranged to be adjacent one another in the circumferential direction through the radial ribs 34.

Figure 3:
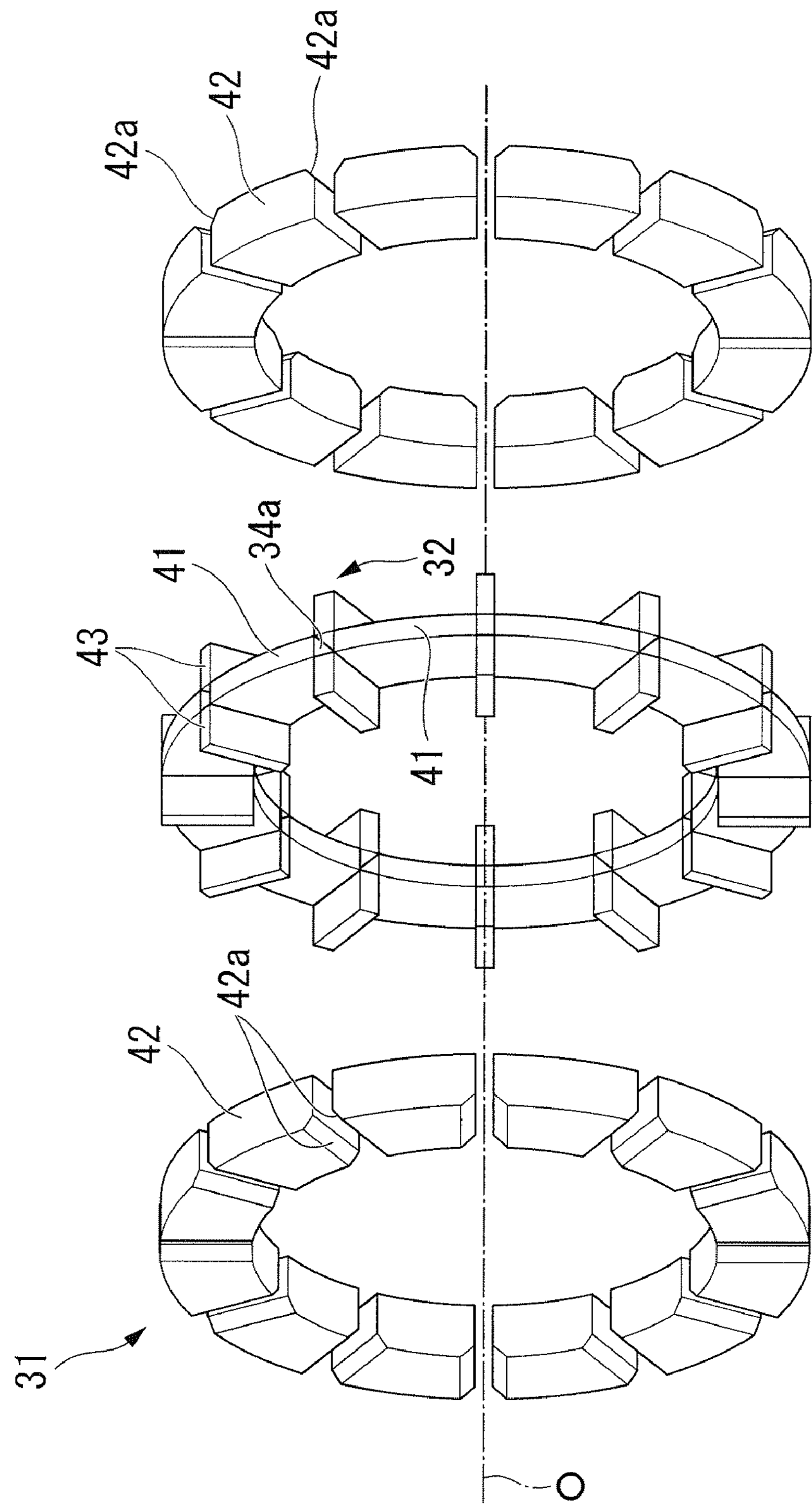
FIG. 3 is an exploded perspective view of a main part of the rotor of the axial gap motor according to the present embodiment.
Figure 4:
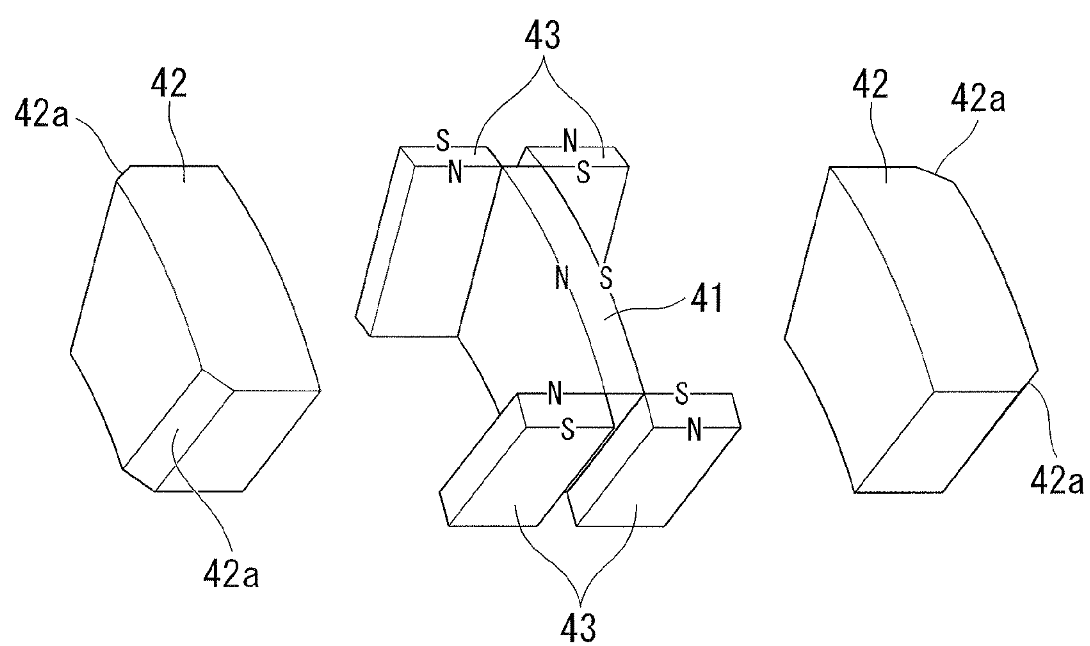
FIG. 4 is an exploded perspective view of the main part of the rotor of the axial gap motor according to the present embodiment.

The main magnet pole portion 31 includes, as illustrated in FIGS. 3 and 4, a main permanent magnet piece 41 which has substantially sectorial plate shape and is magnetized in a thickness direction (that is, the rotation axis O direction) and a pair of magnetic members 42 between which the main permanent magnet piece 41 is interposed from both sides of the thickness direction. The main magnet pole portions 31 which are adjacent in the circumferential direction are set so that magnetization directions of their main permanent magnet pieces 41 are different. That is, to the main magnet pole portion 31 having the main permanent magnet piece 41 of which one side in the rotation axis O direction is magnetized with N pole, the main magnet pole portion 31 having the main permanent magnet piece 41 of which one side in the rotation axis O direction is magnetized with S pole is adjacent.

A plurality of the main magnet pole portions 31 accommodated in the rotor frame 33 are interposed between the inner-peripheral cylindrical portion 36 and the outer-peripheral cylindrical portion 35 from the both sides of the radial direction and are arranged to be adjacent one another in the circumferential direction through the radial ribs 34.

That is, in the rotor frame 33, the main permanent magnet piece 41 of each main magnet pole portion 31 is interposed between the two radial ribs 34 from the both sides of the circumferential direction.

A pair of the magnetic members 42 which cover one surface and the other surface in the thickness direction of the main permanent magnet pieces 41 have a substantially sectorial cross-sectional shape in the thickness direction which is the same as the cross-sectional shape of the main permanent magnet piece 41.

Both end portions of the magnetic member 42 in the circumferential direction are provided with chamfered portions **42*a*** having a chamfered shape.

The sub magnet portion 32 includes, for example, a pair of sub permanent magnet pieces 43 between which the radial rib 34 is interposed from both sides of the rotation axis O direction in the rotor frame 33. A pair of the sub permanent magnet pieces 43 which are opposed to each other in the rotation axis O direction are magnetized, for example, as illustrated in FIG. 4, in the rotation axis O direction and a direction (substantially the circumferential direction) perpendicular to the radial direction so that their magnetization directions are different.

In the rotor frame 33, the sub permanent magnet pieces 43 of the sub magnet portions 32 which are adjacent to each other in the circumferential direction have the magnetic member 42 of the main magnet pole portion 31 interposed therebetween from the both sides of the circumferential direction.

In FIG. 2 illustrating the rotor frame 33 and components other than the rotor frame 33 (that is, the main magnet pole portions 31 and the sub magnet portions 32) of the rotor 11 separately, and in FIG. 3 illustrating the components of the rotor 11 other than the rotor frame 33 (that is, the main magnet pole portions 31 and the sub magnet portions 32), a space portion 34*a* in which the radial rib 34 of the rotor frame 33 is placed is formed between a pair of the sub permanent magnet pieces 43 opposed in the rotation axis O direction and the main permanent magnet pieces 41 adjacent in the circumferential direction.

A pair of the sub permanent magnet pieces 43 opposed to each other in the circumferential direction through the magnetic member 42 have, for example, different magnetization directions as illustrated in FIG. 4.

With regard to a pair of the sub permanent magnet pieces 43 disposed on the one side in the rotation axis O direction, the same poles as the pole of the one side of the main permanent magnet piece 41 magnetized in the rotation axis O direction are opposed to each other, and with regard to a pair of the sub permanent magnet pieces 43 disposed on the other side in the rotation axis O direction, the same poles as the pole of the other side of the main permanent magnet piece 41 magnetized in the rotation axis O direction are opposed to each other.

That is, for example, with respect to the main permanent magnet piece 41 of which the one side has the N pole and the other side has the S pole in the rotation axis O direction, a pair of the sub permanent magnet pieces 43 between which the magnetic member 42 is interposed from the both sides of the circumferential direction on the one side of the rotation axis O direction are disposed so that their N poles are opposed to each other in the circumferential direction, and a pair of the sub permanent magnet pieces 43 between which the magnetic member 42 is interposed from the both sides of the circumferential direction on the other side of the rotation axis O direction are disposed so that their S poles are opposed to each other in the circumferential direction.

Accordingly, due to a flux lens effect caused by a so-called Halbach array of permanent magnets, fluxes of the main permanent magnet pieces 41 and the sub permanent magnet pieces 43 are converged together, and effective fluxes interlinked with each stator 12 relatively increase.

Figure 5:
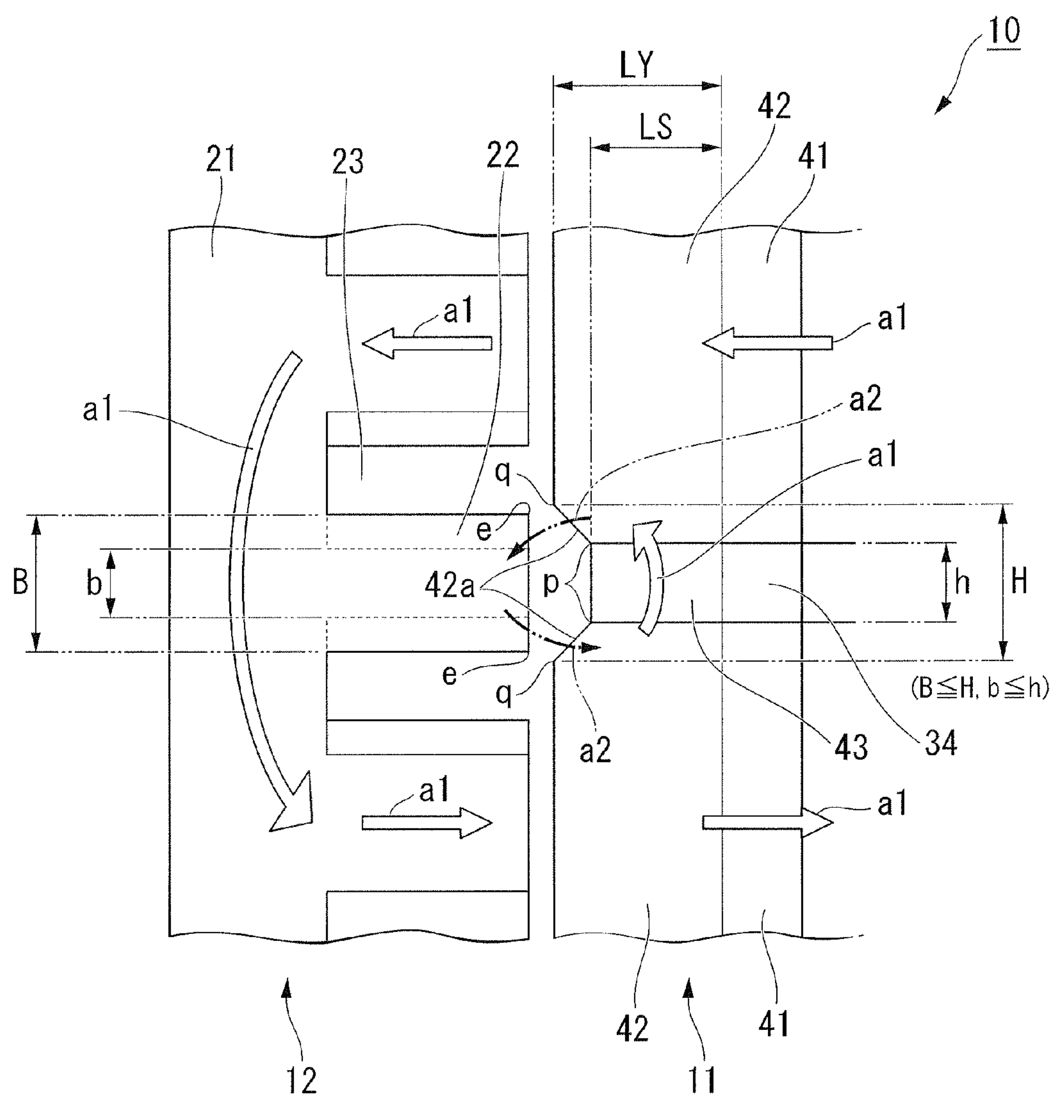
FIG. 5 is a side view of main parts of a stator and the rotor of the axial gap motor according to the present embodiment as viewed from an outside to an inside in a radial direction, where reference numeral al denotes a magnet flux and reference numeral a2 denotes a short-circuit flux.

For example, as illustrated in FIG. 5, a length LY (>LS) of the magnetic member 42 in the rotation axis O direction is larger than a length LS of the sub permanent magnet piece 43 in the rotation axis O direction. In addition, in FIG. 5, reference numeral al denotes a magnet flux, and reference numeral a2 denotes a short-circuit flux.

With regard to an outer-peripheral circumferential width B and an inner-peripheral circumferential width b of a front end portion of the tooth 22 of the stator 12, and a first interval h between the magnetic members 42 which are adjacent in the circumferential direction (that is, an interval between inner ends p along the circumferential direction of their chamfered portions 42*a*) and a second interval H (that is, an interval between outer ends q along the circumferential direction of their chamfered portions 42*a*), the second interval H is equal to or greater than the outer-peripheral circumferential width B, and the first interval h is equal to or greater than the inner-peripheral circumferential width b.

As described above, in the axial gap motor 10 according to this embodiment, the sub permanent magnet piece 43 magnetized in a direction perpendicular to the magnetization direction of the main permanent magnet piece 41 is provided on a circumferential end portion of the main permanent magnet piece 41 to exhibit the flux lens effect caused by a so-called Halbach array of the main permanent magnet piece 41 and the sub permanent magnet piece 43, so that the fluxes of the main permanent magnet piece 41 and the sub permanent magnet piece 43 are converted, thereby increasing the amount of flux interlinked with the stator winding of the stator 12.

In addition, the magnetic member 42 is provided on a surface of the main permanent magnet piece 41, so that reluctance torque can be increased. In addition, the degradation in permeance of the main permanent magnet piece 41 can be prevented, so that the demagnetization of the main permanent magnet piece 41 can be suppressed.

Moreover, the length LY (>LS) of the magnetic member 42 in the rotation axis O direction is larger than the length LS of the sub permanent magnet piece 43 in the rotation axis O direction so as to protrude toward the stator 12 as compared with the sub permanent magnet piece 43. Therefore, the reluctance torque can further be increased, thereby increasing torque that can be output, without increasing the amount of permanent magnets for the rotor 11.

In addition, since the circumferential end portion of the magnetic member 42 has a chamfered shape, a void can be enlarged for the front end portion of the tooth 22 protruding from the stator 12 toward the rotor 11, for example, a front end (for example, a front end e shown in FIG. 5) which is more likely to have flux leakage due to its surface bend, for example, at substantially right angle or the like, so that the circumferential end portion of the magnetic member 42 can be given a shape which is less likely to cause flux leakage. Accordingly, the generation of a short-circuit loop of magnet flux (especially, a magnet flux of the sub permanent magnet piece 43) between the front end portion of the tooth 22 and the circumferential end portion of the magnetic member 42 is suppressed, thereby preventing the degradation in torque potential. Further, due to the chamfered portion 42*a*, the generation of torque ripple can be suppressed.

In addition, the second interval H between the magnetic members 42 is equal to or greater than the outer-peripheral circumferential width B of the tooth 22, and the first interval h between the magnetic members 42 is equal to or greater than the inner-peripheral circumferential width b of the tooth 22, so that the generation of a short-circuit loop of magnet flux (especially, a magnet flux of the sub permanent magnet piece 43) can further be suppressed, thereby preventing the degradation of torque potential.

Figure 6:
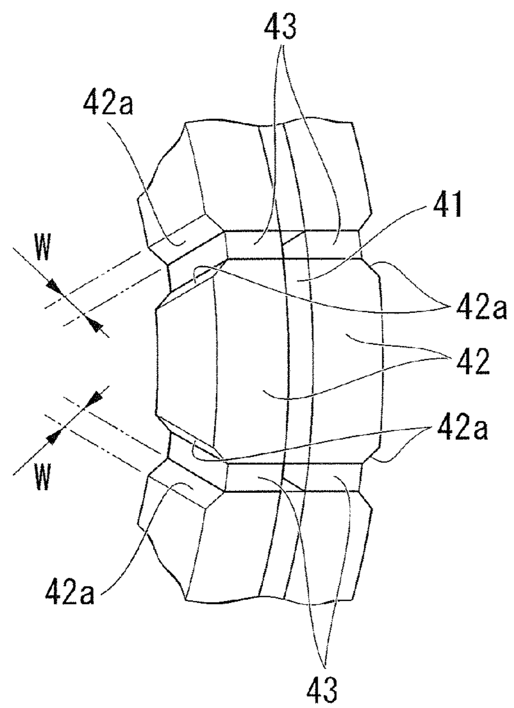
FIG. 6 is a perspective view of the main part of the rotor of the axial gap motor according to the present embodiment.
Figure 7:
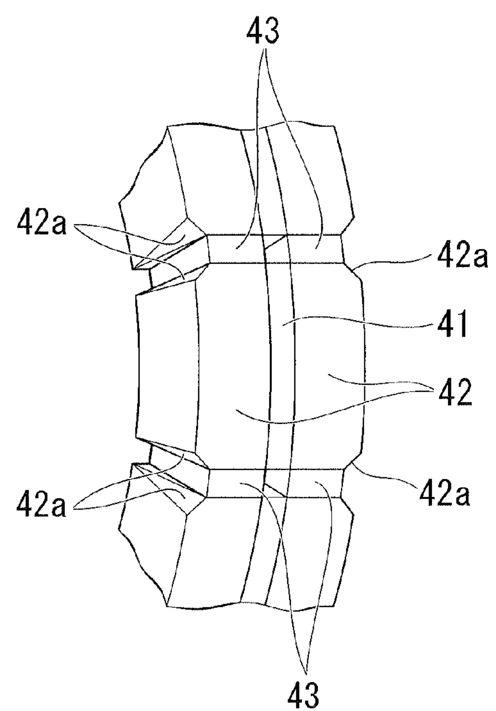
FIG. 7 is a perspective view of a main part of a rotor of an axial gap motor according to an example modified from the present embodiment of the present invention.
Figure 8:
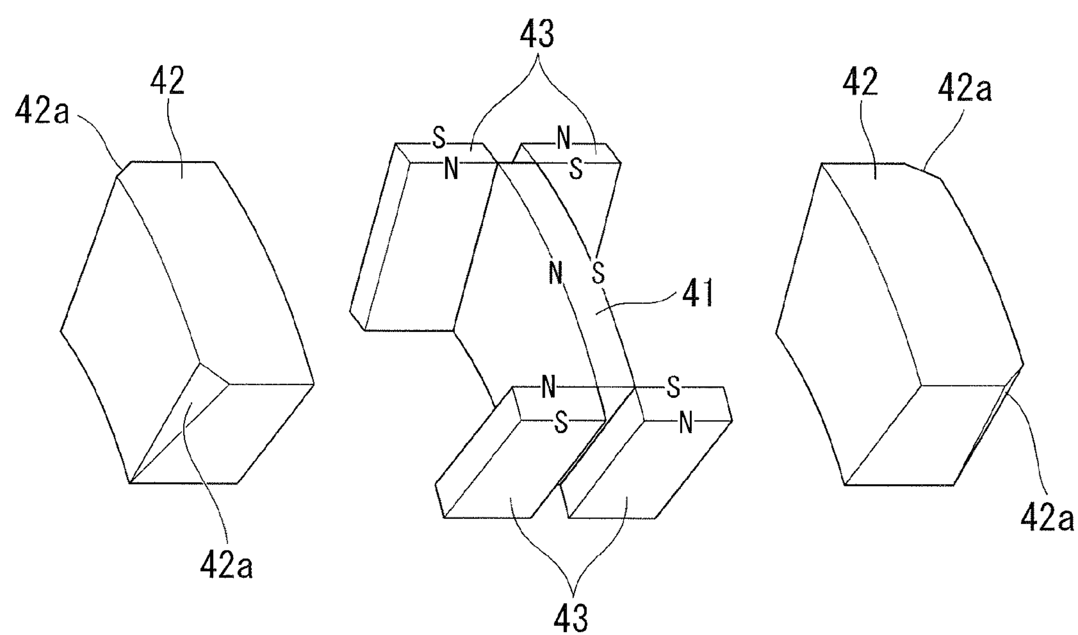
FIG. 8 is an exploded perspective view of the main part of the rotor of the axial gap motor according to the modified example.

In addition, in the embodiment described above, for example, as illustrated in FIG. 6, the chamfered portion 42*a* having a chamfered shape with the uniform width W from the outside toward the inside in the radial direction is provided for the circumferential end portions of the magnetic member 42. However, the embodiment is not limited thereto, and for example, as illustrated in FIGS. 7 and 8, a chamfered portion 42*c* of which a width changes to be reduced toward the inside from the outside in the radial direction may be provided.

In this case, the circumferential width of each of the teeth 22 provided along the circumferential direction of the stator 12 changes to be reduced from the outside toward the inside in the radial direction. On the contrary, the circumferential width of the sub permanent magnet piece 43 is the uniform from the outside to the inside in the radial direction. The circumferential interval between the magnetic members 42 between which the sub permanent magnet piece 43 is interposed from the both sides of the circumferential direction is uniform from the outside toward the inside in the radial direction. Therefore, the distance between the front end portion of the tooth 22 and the circumferential end portion of the magnetic member 42 changes to be increased from the outside toward the inside in the radial direction. Accordingly, since the chamfered portion 42*c* of the circumferential end portion of the magnetic member 42 changes to be reduced in size from the outside toward the inside in the radial direction, the distance between the front end portion of the tooth 22 and the chamfered portion 42*c* of the magnetic member 42 can be made uniform from the outside toward the inside in the radial direction. Therefore, for example, it is possible to prevent the generation of points where flux leakage is likely to occur due to nonuniformity in the distance in the radial direction.

Figure 9:
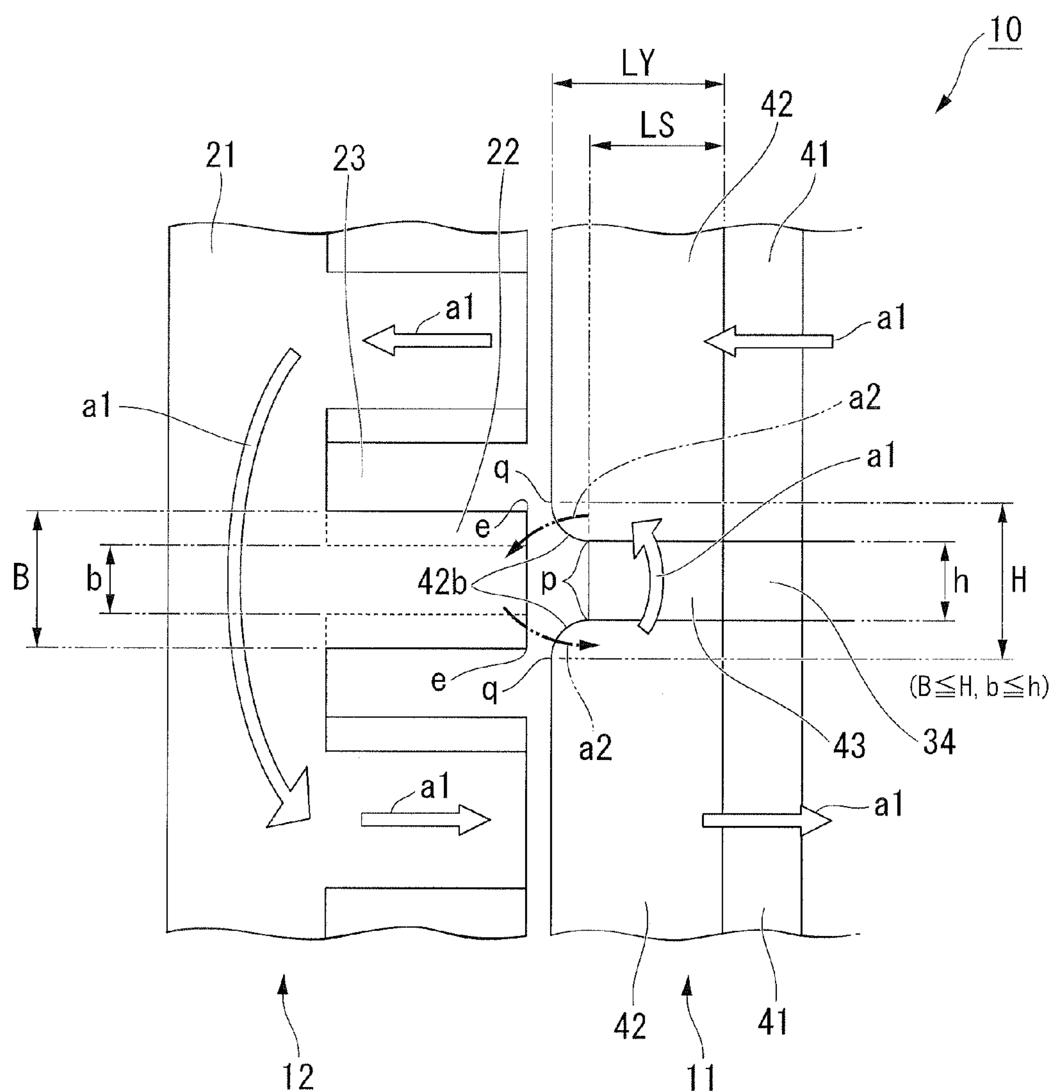
FIG. 9 is a side view of main parts of a stator and the rotor of the axial gap motor according to the modified example as viewed from an outside to an inside in a radial direction, where reference numeral al denotes a magnet flux and reference numeral a2 denotes a short-circuit flux.

In addition, in the embodiment described above, the circumferential both end portions of the magnetic member 42 are provided with the chamfered portions 42*a* and 42*c* having a chamfered shape. However, the embodiment is not limited thereto, and for example, as illustrated in FIG. 9, instead of the chamfered portion 42*a*, the circumferential end portion of the magnetic member 42 may be provided with a curved surface portion 42*b* having a substantially arc shaped cross-section in the radial direction (in FIG. 9, reference numeral al denotes a flux, and reference numeral a2 denotes a short-circuit flux). In addition, the curved surface portion 42*b* may change reduced in size from the outside toward the inside in the radial direction.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

INDUSTRIAL APPLICABILITY

In the axial gap motor according to the invention, the circumferential end portion of the main magnet is provided with the sub permanent magnet magnetized in a direction perpendicular to the magnetization direction of the main magnet, so that due to a flux lens effect caused by a so-called Halbach array of the main magnet and the sub permanent magnet, the fluxes of the main magnet and the sub permanent magnet can be converged. Therefore, the amount of flux interlinked with the stator winding of the stator can be increased.

The invention claimed is:

1. An axial gap motor comprising:

a rotor that is rotatable around a rotation axis; and a pair of stators that are opposed to each other with the rotor interposed therebetween from both sides in a rotation axis direction which is parallel with the rotation axis of the rotor, each stator having a plurality of teeth extending toward the rotor, wherein each tooth extends in parallel with the rotation axis direction and has a circumferential width that changes to be reduced from an outside toward an inside in a radial direction, wherein the rotor includes:

a plurality of main magnets arranged in a circumferential direction so that a flux direction is parallel with the rotation axis direction;

a sub permanent magnet which is disposed in the vicinity of a circumferential end portion of the main magnet and is magnetized in a direction perpendicular to the rotation axis direction and the radial direction; and a magnetic member which is provided on a surface of at least one of the one side and the other side in the rotation axis direction of the main magnet, wherein a length of the magnetic member in the rotation axis direction is larger than a length of the sub permanent magnet in the rotation axis direction, wherein a circumferential end portion of the magnetic member changes to be reduced in size from the outside toward the inside in the radial direction to maintain a substantially uniform distance between a front end portion of each tooth and the circumferential end portion of the magnetic member;

wherein the circumferential end portion of the magnetic member is provided with a chamfered portion having a chamfered shape; and wherein a first interval between the magnetic members is defined between inner ends of adjacent the chamfered portion portions in the circumferential direction and a second interval is defined between outer ends of adjacent chamfered portions in the circumferential direction, changes to be reduced in size from an outside toward an inside in the radial direction and wherein each tooth has an outer-peripheral circumferential width and an inner-peripheral circumferential width of a front end portion, the second interval being equal to or greater than the outer-peripheral circumferential width and the first interval being equal to or greater than the inner-peripheral circumferential width.

2. An axial gap motor comprising:

a rotor that is rotatable around a rotation axis; and a pair of stators that are opposed to each other with the rotor interposed therebetween from both sides in a rotation axis direction which is parallel with the rotation axis of the rotor, each stator haying a plurality of teeth extending toward the rotor, wherein each tooth extends in parallel with the rotation axis direction and has a circumferential width that changes to be reduced from an outside toward an inside in a radial direction, wherein the rotor includes:

a plurality of main magnets arranged in a circumferential direction so that a flux direction is parallel with the rotation axis direction;

a sub permanent magnet which is disposed in the vicinity of a circumferential end portion of the main magnet and is magnetized in a direction perpendicular to the rotation axis direction and the radial direction; and a magnetic member which is provided on a surface of at least one of the one side and the other side in the rotation axis direction of the main magnet, wherein a length of the magnetic member in the rotation axis direction is larger than a length of the sub permanent magnet in the rotation axis direction, wherein a circumferential end portion of the magnetic member changes to be reduced in size from the outside toward the inside in the radial direction to maintain a substantially uniform distance between a front end portion of each tooth and the circumferential end portion of the magnetic member;

wherein the circumferential end portion of the magnetic member is provided with a curved surface portion having a substantially arc shaped cross-section in the radial direction; and wherein a first interval between the magnetic members is defined between inner ends of adjacent the curved surface portion portions in the circumferential direction and a second interval is defined between outer ends of adjacent chamfered portions in the circumferential direction, changes to be reduced in size from an outside toward an inside in the radial direction and wherein each tooth has an outer-peripheral circumferential width and an inner-peripheral circumferential width of a front end portion, the second interval being equal to or greater than the outer-peripheral circumferential width and the first interval being equal to or greater than the inner-peripheral circumferential width.

* * * * *